(12) United States Patent
Streicher

(10) Patent No.: US 10,638,719 B1
(45) Date of Patent: May 5, 2020

(54) CEILING INLET FOR AIR VENTILATING SYSTEM

(71) Applicant: Double L Group, LLC, Dyserville, IA (US)

(72) Inventor: Dick Streicher, Farmersburg, IA (US)

(73) Assignee: DOUBLE L GROUP, LLC, Dyersville, IA (US)

( * ) Notice: Subject to any disclaimer, the term of this patent is extended or adjusted under 35 U.S.C. 154(b) by 134 days.

(21) Appl. No.: 15/868,685

(22) Filed: Jan. 11, 2018

Related U.S. Application Data

(60) Provisional application No. 62/446,003, filed on Jan. 13, 2017.

(51) Int. Cl.
| | | |
|---|---|---|
| *F24F 7/00* | (2006.01) | |
| *A01K 1/00* | (2006.01) | |
| *A01K 31/22* | (2006.01) | |

(52) U.S. Cl.
CPC .......... *A01K 1/0058* (2013.01); *A01K 1/0052* (2013.01); *A01K 31/22* (2013.01)

(58) Field of Classification Search
CPC ... A01K 1/0058; A01K 1/0047; A01K 1/0082
USPC .................................. 454/299, 301; 119/448
See application file for complete search history.

(56) References Cited

U.S. PATENT DOCUMENTS

| | | | | |
|---|---|---|---|---|
| 2,600,105 | A * | 6/1952 | Fuller | B65D 5/425 493/128 |
| 5,201,685 | A * | 4/1993 | Raisanen | A01K 1/0058 454/259 |

* cited by examiner

*Primary Examiner* — Vivek K Shirsat
(74) *Attorney, Agent, or Firm* — Shuttleworth & Ingersoll, PLC; James C. Nemmers

(57) ABSTRACT

The frames of the Inlets have endcaps and profiles that allow an inlet to be made to different lengths to provide an inlet of a size to provide the proper amount of air needed. Each inlet also has fully insulated blades, sides, and center profiles. The components are preferably foam filled with insulation and have an insulated foam insert on the endcaps together with a center pull so that only a single pull line is needed to operate the inlet.

5 Claims, 6 Drawing Sheets

CEILING INLET FOR AIR VENTILATING SYSTEM

This application claims priority to U.S. Provisional Patent Application No. 62/446,003 filed Jan. 13, 2017, which application is incorporated by reference herein.

BACKGROUND OF THE INVENTION

Air inlets for buildings used in agriculture, such as swine confinement buildings, are designed to bring fresh air into the building and provide the desired amount of air for the animals. Currently known inlets are available in fixed sizes so a building owner has to purchase an oversized inlet in order to assure the proper amount of air needed will be supplied. There is therefore a need for an improved inlet that will make it easier for a purchaser to determine the number and type of air inlets for a particular building.

SUMMARY OF THE INVENTION

The Inlets of the invention are designed with endcaps and profiles that allow an inlet to be adjusted to different lengths to provide the proper amount of air needed. Therefore, the inlets of the invention make it easier to determine the correct number of air inlets needed in a particular building. Each inlet also has fully insulated blades, sides, and center profiles. The components are preferably foam filled with insulation and have an insulated foam insert on the endcaps. Also, the Inlets of the invention have a center pull inlet so that only a single pull line is needed to operate both lids, lowering installation costs.

DESCRIPTION OF THE PREFERRED EMBODIMENTS OF THE INVENTION

Figure 1:
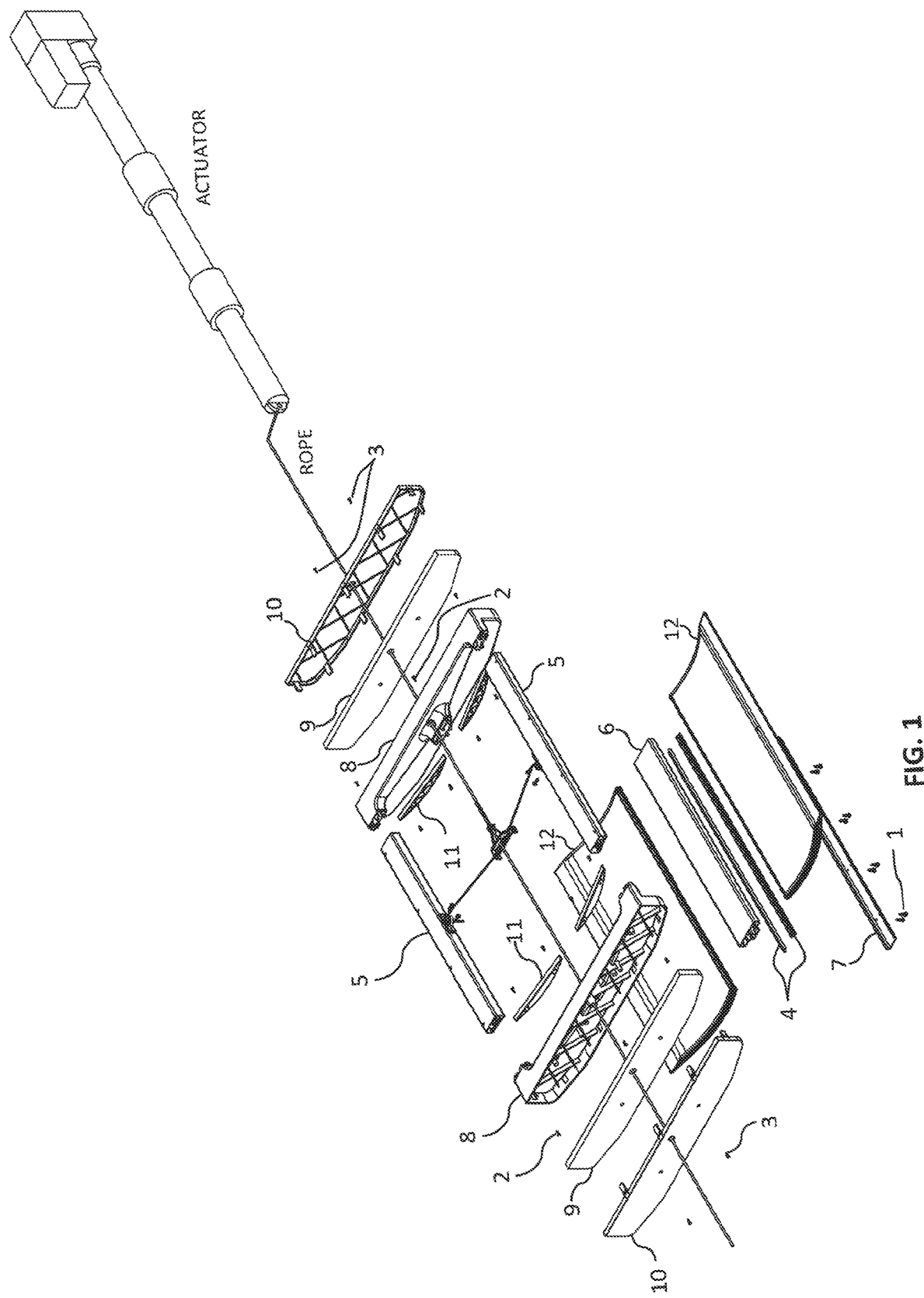
FIG. 1 is an exploded view of the overall assembly of the ceiling inlet.

FIG. 1 shows in an exploded view the overall assembly of the inlet. The inlet is supported by a frame which consists of the longitudinal members 5 combined with end caps 8, to provide the rectangular shape desired so as to retrofit a building, such as a barn, in which the inlet of the invention is to be installed. In order to insulate the inlet, the end caps 8 are insulated with foam inserts 9 held in place against the end caps 8 by covers 10. The inlet assembly is held together by fasteners 1, 2 and 3. The endcap covers 10 are attached to both endcaps 8 also to reduce the amount of dust that can enter and settle in the endcaps 8. By allowing only a minimal amount of dust to settle in the endcaps 8, the biosecurity risk is reduced because the inlet is easier to clean to remove both dust and possible disease caring particles. The foam inserts 9 also minimize the amount of "sweating" the inlet will experience in the winter caused from condensation.

Figure 2:
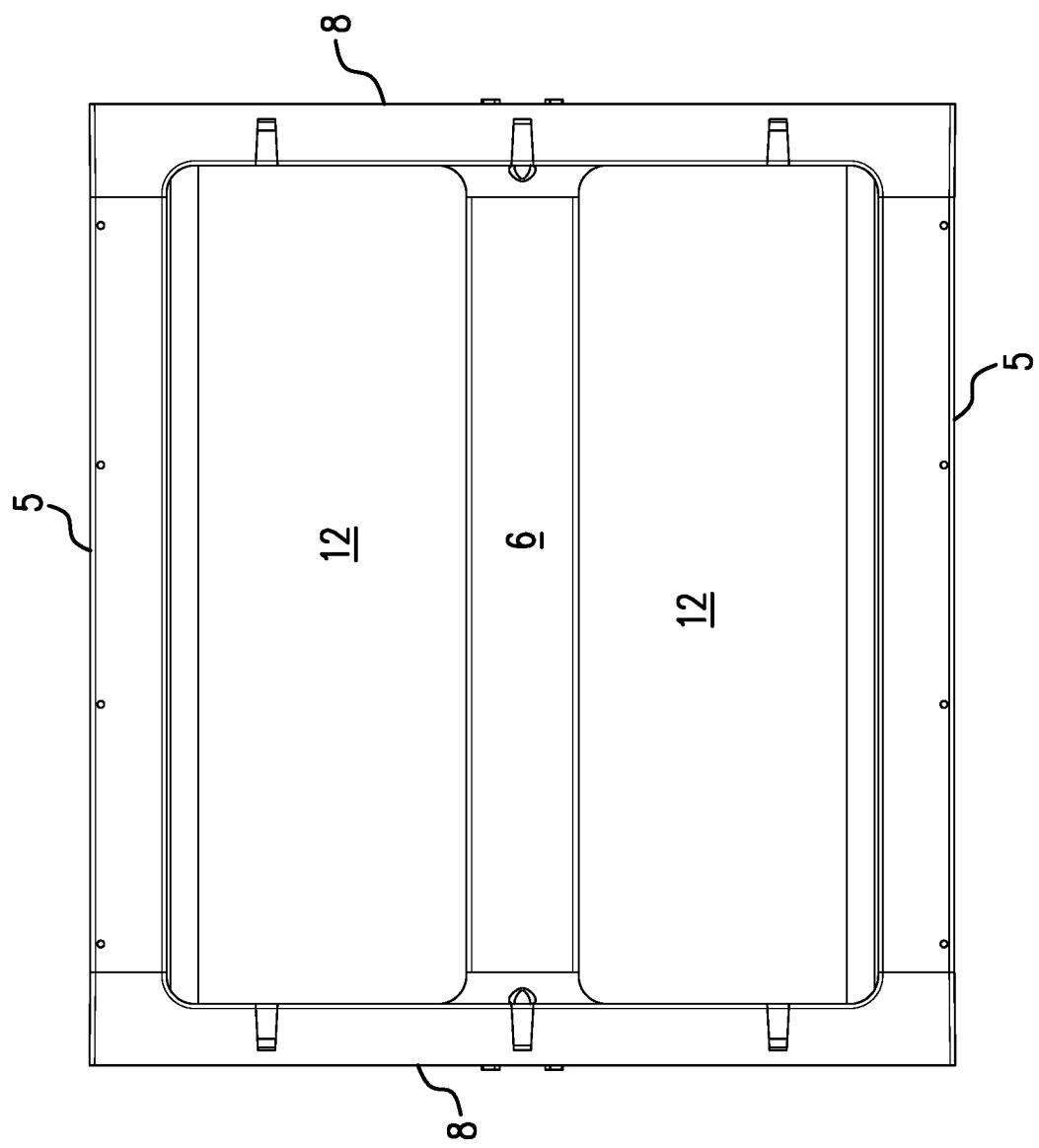
FIG. 2 is a top plan view of the inlet.
Figure 3:
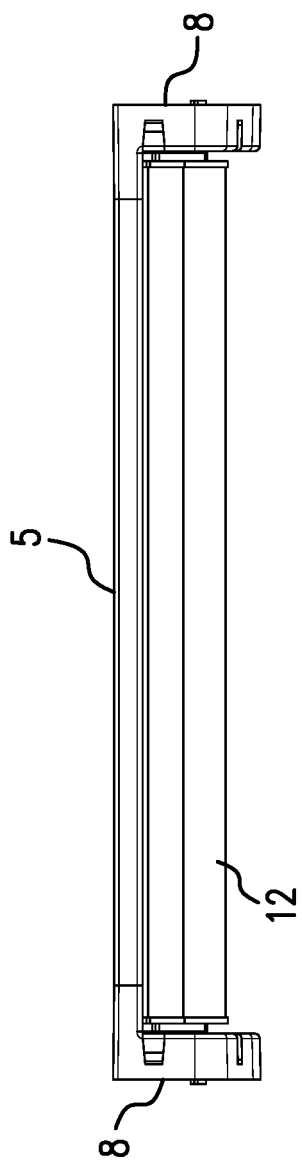
FIG. 3 is a side view of the inlet.
Figure 4:
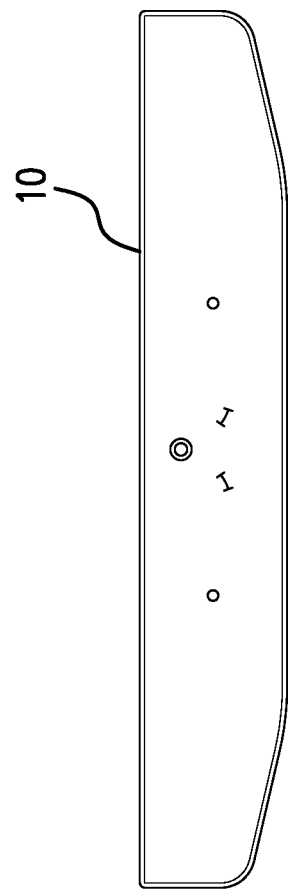
FIG. 4 is an end view of the inlet.
Figure 5:
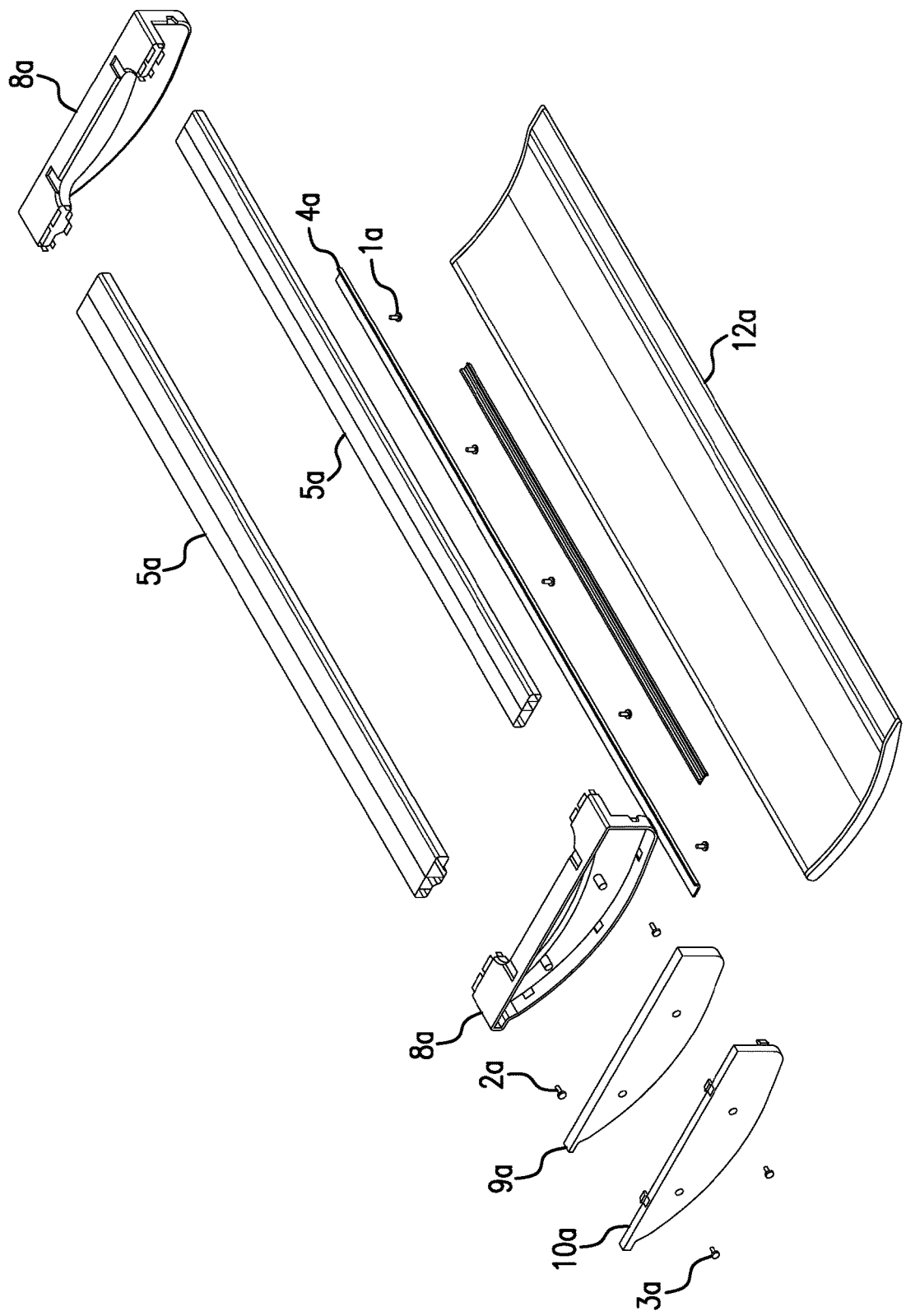
FIG. 5 is an exploded view of another version of the ceiling inlet.
Figure 6:
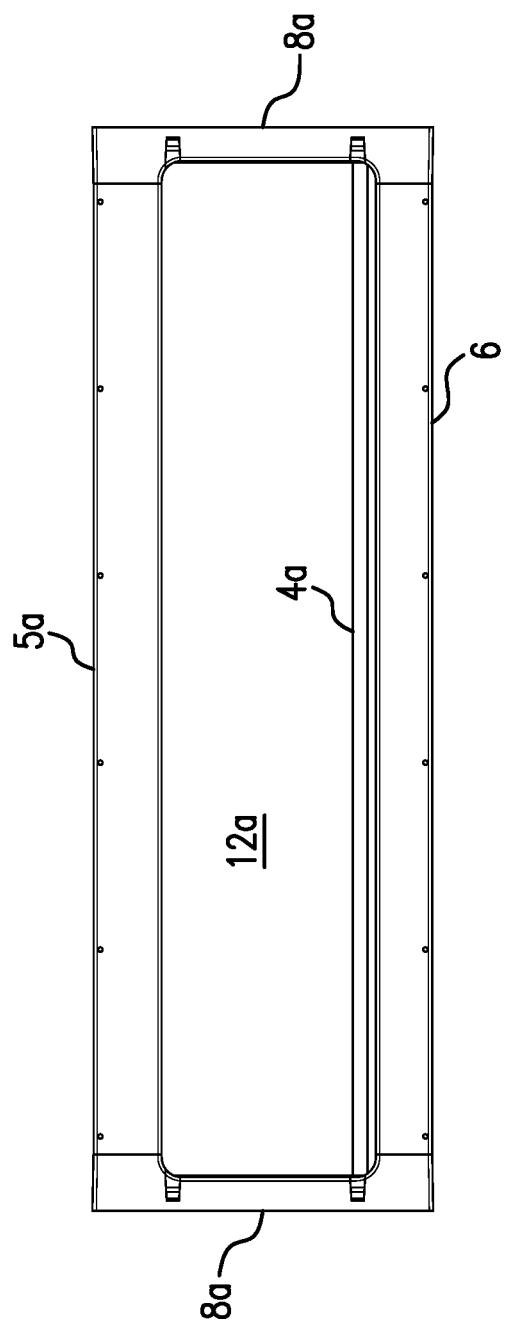
FIG. 6 is a plan view of the inlet of FIG. 5.
Figure 7:
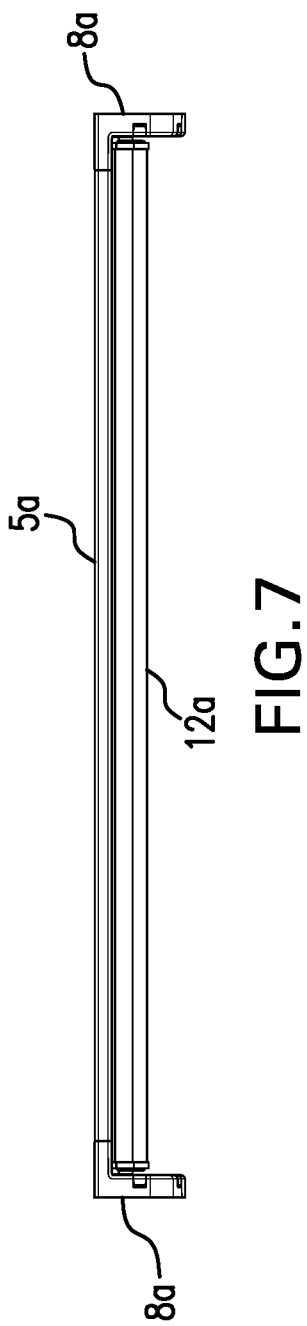
FIG. 7 is a side view of the inlet of FIG. 5.

A center profile 6 is also part of the frame, and it is attached to the end caps 8 in the center of the frame. Member 7 is secured to the bottom of the center profile 6 and is narrower than profile 6 to provide an area for the hinges 4 on each side of profile 6 to pivotally mount the louvers 12 ("wing doors"). The louvers 12 pivot at different magnitudes depending on the weather and are insulated. Door fillers 11 are attached to the endcaps 8 that form part of the frame of the inlet. When closed, the louvers 12 sit against the door fillers 11 so as to minimize leakage of air into the room. Although not shown, it will be understood by those skilled in the art that a rope is connected to both louvers 12, with the rope strung through the frame of the inlet, and then attached directly to an actuator. The rope would be strung through the frame of the inlet from left to right in FIG. 2, the top view of the inlet. When the actuator moves to open the inlet, the rope is no longer in tension. In response, the louvers 12 will rotate on the hinges 4 at the center profile 6 and descend toward the interior room of the barn. Consequently, air enters past the louvers 12 and into the room. The inlet is able to provide a variable amount of opening in order to provide airflow for different seasons. In the summer time when it is imperative to have sufficient ventilation to avoid heat-stressing the animals being housed, the inlet will be opened all the way with the louvers 12 fully pivoting at the hinges 4. In winter time situations, when it is necessary not to over-ventilate the animals and therefore "chill" them, the louvers 12 will pivot a smaller amount leaving a smaller opening, reducing the total volumetric flow rate of air moving through the barn housing the animals.

The inlet of FIGS. 1-4 is primarily used in swine barns, and is installed in the barn in the ceiling near the sidewall. It's attached in that location in order to provide a better air jet throw across the barn and provide better mixing of air for the benefit of the animals.

Referring now to another version of the inlet shown in FIGS. 5-8 which version has a single louver. Components similar to those of the first embodiment of FIGS. 1-4 are identified by the same reference numeral as the first embodiment followed by the letter "a". The inlet of the second embodiment is comprised of a frame which consists of longitudinal members 5a combined with endcaps 8a. The end caps 8a are connected to the members 5a to provide the rectangular shape desired that will retrofit barns in which the inlets are going to be installed. The center profile 6a is mounted between endcaps 8a to house a hinge 4a that provides for pivotally mounting a louver 12a similar to the mounting of the louvers of the version shown in FIGS. 1-5. An endcap cover 10a holds in place a foam insert 9a that is secured inside endcap 8a for insulation and in order to reduce the amount of dust that can enter and settle in the endcaps 8a for the same reasons as the inlet of the version of FIGS. 1-5. As in the inlet of the first version, foam inserts 9a minimize the amount of "sweating" the inlet will experience in the winter caused from condensation. The louver 12a pivots on hinge 4a at different magnitudes depending on the weather. As in the inlet of the first version, the inlet assembly is held together by fasteners 1a, 2a and 3a.

Figure 8:
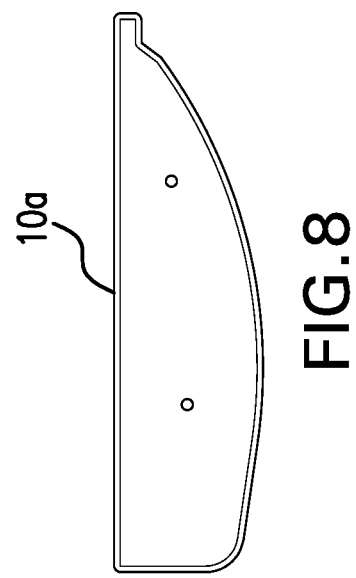
FIG. 8 is an end view of the inlet of FIG. 5.

The inlet of this version is primarily used in poultry barns, and is installed in the barn in the ceiling near the sidewall. It's attached in that location in order to provide a better air jet throw across the barn and provide better mixing of air for the benefit of the animals. The inlet of this version is also actuated, similar to the inlet of the first version. When the actuator moves, the rope loses tension and allows the louver 12a to descend into the room. As best seen in FIG. 8, the end view of the inlet is curved to match the louver 12a profile, and it illustrates how the louver 12a would pivot at the hinge 4a and descend downwards to allow air to enter into the room.

From the above description, it can be seen that the same size endcaps can accommodate longitudinal member and profiles of different lengths so as to provide for an inlet to be designed for openings of different sizes depending upon the proper amount of air needed. Also, the insulation and the foam inserts provide for improved dust control and reduce issues created by varying air temperatures. Having those described the invention and illustrated the it in connection with the preferred embodiments, it will be understood by those skilled in the art that various revisions can be made to the preferred embodiments described above without departing from the spirit and scope of the invention which is defined by the following claims.

The invention claimed is:

1. A ceiling inlet for an air ventilating unit for use in a building having a fan and an actuator that provides air flow to and from an interior of the building to an exterior of the building, said inlet comprising:
   a frame suitable for mounting the unit in the ceiling of the building, the frame having an opening providing communication to the exterior of the building and wherein the frame includes end caps combined with longitudinal members extending between and spaced from the end caps to form the opening;
   the longitudinal members being sized of a length to form the opening of a desired size;
   at least one louver having a bottom edge and a top edge that pivotally mounts the louver between the end caps of the frame so that the louver is moveable from an open position to a closed position, wherein the at least one louver is curved convexly with respect to the interior of the building, and wherein the bottom edge of the at least one louver engages one of the longitudinal members to close off the air flow into and out of the building;
   door fillers attached to the interior of the endcaps with respect to the opening, wherein the door fillers are curved convexly with the same curvature as the at least one louver, and wherein the at least one louver engages the door fillers when the at least one louver is in the closed position to prevent air flow into and out of the building; and
   the end caps each having an insulated insert and a cover enclosing the insulated insert in the end cap.

2. The ceiling inlet of claim 1 in which the at least one louver is insulated.

3. The ceiling inlet of claim 1 in which there is a center profile combined with the end caps between the longitudinal members, and wherein the at least one louver includes two louvers, wherein each of the two louvers is pivotally mounted on each side of the center profile, each of the two louvers being independently movable.

4. The ceiling inlet of claim 3 in which the two louvers are insulated.

5. The ceiling inlet of claim 1, wherein a rope is connected to the at least one louver such that the actuator adjusts a tension of the rope to move the at least one louver between the open position and the closed position.

* * * * *